United States Patent [19]

Braden et al.

[11] 4,285,874

[45] Aug. 25, 1981

[54] 1-ISOCYANATO-ANTHRAQUINONES

[75] Inventors: Rudolf Braden, Odenthal-Scheuren; Rütger Neeff, Leverkusen, both of Fed. Rep. of Germany

[73] Assignee: Bayer Aktiengesellschaft, Leverkusen, Fed. Rep. of Germany

[21] Appl. No.: 74,690

[22] Filed: Sep. 12, 1979

[30] Foreign Application Priority Data

Sep. 29, 1978 [DE] Fed. Rep. of Germany ....... 2842539

[51] Int. Cl.³ .................. C07C 101/80; C07C 103/75; C07C 118/02
[52] U.S. Cl. .................................... 260/376; 260/377; 260/453 PH; 260/453 AR
[58] Field of Search ................. 260/376, 377, 453 PH, 260/453 AR

[56] References Cited

U.S. PATENT DOCUMENTS

| | | | |
|---|---|---|---|
| 2,733,254 | 1/1956 | Allen et al. | 260/453 PH |
| 3,607,903 | 9/1971 | Csuros et al. | 260/453 PH |
| 3,641,094 | 2/1972 | Arlt et al. | 260/453 PH |
| 3,781,320 | 12/1973 | Irwin | 260/453 PH |
| 3,993,677 | 9/1976 | Asato | 260/453 AR |

FOREIGN PATENT DOCUMENTS

| | | |
|---|---|---|
| 224490 | 3/1909 | Fed. Rep. of Germany. |
| 231853 | 5/1909 | Fed. Rep. of Germany. |
| 695646 | 8/1940 | Fed. Rep. of Germany. |

OTHER PUBLICATIONS

*Anthracene and Arthraquinone,* pp. 219–222, Barnett, Van Nostrand Co., New York, N.Y., 1921.

*Primary Examiner*—Winston A. Douglas
*Assistant Examiner*—Raymond K. Covington
*Attorney, Agent, or Firm*—Sprung, Felfe, Horn, Lynch & Kramer

[57] ABSTRACT

1-Isocyanato-anthraquinones, which are valuable dyestuff intermediate products, are obtained in good yields when 1-amino-anthraquinones are introduced into phosgene or a solution of phosgene at −10° to 50° C., the reaction mixture is heated to 100° to 200° C. while passing phosgene through it and phosgene and hydrogen chloride are then expelled from the reaction mixture with an inert medium which is gaseous under the reaction conditions.

4 Claims, No Drawings

1-ISOCYANATO-ANTHRAQUINONES

The invention relates to 1-isocyanato-anthraquinones and their preparation.

Whilst 2-isocyanato-anthraquinones have already been known for a long time, 1-isocyanato-anthraquinones have not hitherto been successfully prepared, although there has been no lack of attempts to convert 1-amino-anthraquinones into the corresponding isocyanates. However, only undefinable conversion products have hitherto been obtained in this process, so that the conviction that "α-aminoanthraquinone yields no isocyanate at all" has already been expressed (German Patent Specification No. 2,244,90); this opinion has not yet been contradicted.

Surprisingly, it has now been found that 1-isocyanato-anthraquinones are obtained when the corresponding 1-amino-anthraquinones, which can be substituted by nonionic substituents customary in the chemistry of anthraquinones and inert towards phosgene, are introduced into phosgene or a solution of phosgene at $-10°$ to $+50°$ C., the reaction mixture is heated to $100°$ to $200°$ C., whilst passing phosgene through it, and phosgene and hydrogen chloride are then expelled from the reaction mixture with an inert medium which is gaseous under the reaction conditions.

Suitable substituents in the anthraquinone nucleus are: $C_1$- to $C_{12}$-alkyl groups, $C_1$- to $C_4$-alkoxy groups, $CF_3$ groups, CN groups, cycloalkyl groups, acyl groups, aryl groups, aralkyl groups and nitro groups, and halogen atoms.

Examples of suitable cycloalkyl radicals are cyclopentyl, cyclohexyl and methylcyclohexyl.

Examples of suitable aralkyl radicals are benzyl and phenylethyl.

Suitable aryl radicals are phenyl radicals, which can be substituted by $C_1$-$C_4$-alkyl, $C_1$-$C_4$-alkoxy, halogen or $NO_2$.

Suitable halogen atoms are F, Br and, above all, Cl.

Suitable acyl groups are alkylcarbonyl or arylcarbonyl, such as acetyl or benzoyl.

Possible starting compounds for the preparation of 1-isocyanato-anthraquinone are: 1-amino-, 1-amino-2-methyl-, 1-amino-2-chloro-, 1-amino-4-chloro-, 1-amino-5-nitro-, 1-amino-2-nitro-, 1-amino-4-nitro-, 1-amino-6-chloro-, 1-amino-7-chloro-, 1-amino-5-chloro-, 1-amino-4-bromo-, 1-amino-2-benzoyl-, 1-amino-2-benzyl-, 1-amino-2-bromo-, 1-amino-4-bromo-, 1-amino-4-bromo-2-(p-chlorobenzoyl)-, 1-amino-4-bromo-2-(chloromethyl)-, 1-amino-4-bromo-2-cyclohexyl-, 1-amino-2-(bromomethyl)-, 1-amino-4-bromo-2-octyl, 1-amino-2-chloro-, 1-amino-4-chloro-, 1-amino-2-(p-chlorobenzoyl)-, 1-amino-4-chloro-2-cyclohexyl-, 1-amino-2-(chloromethyl)-, 1-amino-4-chloro-2-methyl-, 1-amino-4-chloro-5-nitro-, 1-amino-2-cyclohexyl-, 1-amino-2,4-dibromo-, 1-amino-2,4-dibromo-6-chloro-, 1-amino-2,4-dibromo-6,7-dichloro-, 1-amino-6,8-dibromo-2-methyl-, 1-amino-2,4-dibromo-6-methyl-5-nitro-, 1-amino-2,4-dichloro-, 1-amino-4,5-dichloro-, 1-amino-6,7-dichloro-, 4-amino-1,5-dichloro-, 1-amino-2,6-difluoro-, 1-amino-6,7-difluoro-, 1-amino-2-fluoro-, 1-amino-6-fluoro-, 1-amino-2-hexyl-, 1-amino-2-ethyl-, 1-amino-2-nitro-, 1-amino-2-nonyl-, 1-amino-2-propyl-, 1-amino-4,5,8-trichloro-, 1-amino-4,5,8-trichloro-2-nitro, 1-amino-2,3,4-trifluoro-, 1-amino-2-benzoyl-, 1-amino-3-methyl- and 1-amino-2,4,5,8-tetrachloro-anthraquinone.

The preferred variant of the process is charaterised in that phosgene is dissolved in an inert solvent, the 1-amino-anthraquinone is introduced into the phosgene solution or into liquid phosgene at $10°$ to $30°$ C. and the resulting mixture is heated to $150°$ to $185°$ C., to decompose the carbamoyl chloride, first in a stream of phosgene and then in a gaseous stream of an inert medium, until the reaction mixture is free from chloride.

Examples of inert solvents which can be used are aliphatic and aromatic hydrocarbons with at least 6 C atoms, chlorinated hydrocarbons, nitroaromatics, sulpholane and diethyl carbonate.

Chlorinated aromatic hydrocarbons and nitroaromatics, such as chlorobenzene, dichlorobenzene and nitrobenzene, are particularly suitable.

The solvents are employed in the anhydrous form or are rendered anhydrous immediately before the preparation of the phosgene solution by incipient distillation. If the 1-amino-anthraquinone to be employed is introduced into liquid phosgene which is not dissolved in a solvent, the reaction is preferably carried out at $-10°$ to $50°$ C. and under a pressure which corresponds to at least the vapour pressure of the phosgene initially introduced, and is preferably at least 5 bars.

The weight ratio of the total solvent used to 1-amino-anthraquinone should be at least 3:1, and preferably 10 to 100:1. It is also possible to carry out the reaction continuously in a kettle cascade or in several delay tubes and to recycle the solvent. The molar ratio of phosgene to 1-amino-anthraquinone when the 1-amino-anthraquinone is introduced should be at least 3:1, preferably greater than 5:1. The molar ratio of phosgene to the total 1-amino-anthraquinone employed should be 2 to 15:1.

The phosgene solution can be prepared by passing gaseous phosgene into the solvent, cooled if necessary, whilst stirring or shaking. It can be advantageous to prepare the solution under pressure using liquid phosgene. The 1-amino-anthraquinone can be introduced into the phosgene solution in the dissolved form or as a solid. It is particularly advantageous to introduce a suspension of the 1-amino-anthraquinone in one of the inert solvents mentioned into the phosgene solution, dichlorobenzene or nitrobenzene preferably being used.

It can be advantageous to carry out the reaction under pressure. In this case, the autogenous pressure of the components can be utilised. However, it is also possible to establish a superatmospheric pressure of up to 100 bars, in particular up to 50 bars, with an inert gas.

In a particular embodiment of the process, the reaction of the 1-amino-anthraquinone with phosgene is carried out under superatmospheric pressure, the hydrogen chloride formed being passed over a condenser and let down. It is also possible to carry out the reaction of the 1-amino-anthraquinone initially under superatmospheric pressure and, after the 1-amino-anthraquinone has been introduced into the phosgene solution, to release the superatmospheric pressure by letting down, at the rate at which the temperature is increased or immediately, and to carry out the reaction under normal pressure in the temperature range from $130°$ to $200°$ C.

The reaction has ended as soon as chloride can no longer be detected in the reaction mixture.

The rate of reaction depends on the temperature and, when a 1-amino-anthraquinone is used in the solid form, on the particle size. A solid with an approximate particle size $\leq 10$ μm is preferably used.

Increasing the temperature to 100° to 200° C. is always effected whilst passing phosgene through the mixture. When the highest reaction temperature is reached, which can be, for example, the boiling point of the solvent, the stream of phosgene is maintained for a further 10 to 20 minutes, in particular 15 to 100 minutes, before the stream of phosgene is replaced by a stream of an inert gas.

Examples of inert gases which can be used are: nitrogen, carbon dioxide, carbon monoxide and methane.

The isocyanate can be isolated in one of the customary manners. Thus it is possible, for example, to isolate the crystalline isocyanate from the cooled reaction mixture by filtration. It is also possible to distill off the solvent. In this case it is advantageous to distill the mixture under reduced pressure and to avoid sump temperatures of above 150° C., in particular above 120° C., in the distillation.

The new 1-isocyanato-anthraquinones are valuable intermediate products for the preparation of dyestuffs.

Thus, for example, the isocyanate group can be reacted with amines and anthraquinone dyestuffs with urea groupings, such as are described, for example, in DE-OS (German Published Specification) 1,469,741 (=Belgian Patent Specification No. 688,149), can be prepared in this manner.

EXAMPLE 1

1-Isocyanato-anthraquinone 200 g of phosgene are dissolved in 650 g of o-dichlorobenzene at 5° C. A hot solution of 44.6 g ($\approx$0.2 mol) of 1-amino-anthraquinone in o-dichlorobenzene is added dropwise to the phosgene solution in the course of 90 minutes. During this addition, the temperature in the reaction mixture is allowed to rise slowly up to 25° C. and a stream of phosgene is continuously passed through the reaction mixture. A yellow product precipitates. The mixture is then heated to 175° C. in the course of a further 90 minutes whilst passing a stream of phosgene through, whereupon a clear solution forms. After 40 minutes at 175° C., the stream of phosgene is discontinued and nitrogen is passed through the reaction mixture. After a further 60 minutes, the mixture is cooled and, from 120° C., the solvent is distilled off under reduced pressure. The crystalline residue which remains (53 g, still contains small amounts of o-dichlorobenzene) consists of 1-isocyanato-anthraquinone to the extent of 92.1% (NCO titration according to the method in Houben-Weyl, volume 2 (1953), page 557), which corresponds to a yield of 98%. $C_{15}H_7NO_3$ calculated: 72.29% C. 2.83% H 5.62% N; found: 72.2 72.3 2.7 2.8 5.5 5.6.

Melting point 180°–200° C. (under decomposition)

The mass spectrum shows peaks at 249, 221, 193, 165 and 164.

The IR spectrum shows the NCO band at 2,070 $cm^{-1}$ and no band at 1,700 to 1,800 $cm^{-1}$ (—COCl).

EXAMPLE 2

1-Isocyanato-5-nitro-anthraquinone

A solution of 100 g of phosgene in 250 g of o-dichlorobenzene was prepared at 5° to 10° C. A suspension of 26.8 g of 1-amino-5-nitro-anthraquinone in 150 g of o-dichlorobenzene was added at 10° C., whilst stirring. The mixture was stirred at 10° to 20° C. for 7 hours whilst passing a weak stream of phosgene through. The initially red colour of the suspension had changed to yellow after about 3 hours. The reaction mixture was heated to 175° C. in the course of 2 hours and was stirred at this temperature for 2 hours whilst passing phosgene through. Nitrogen was then bubbled through at 175° C. for 1 hour to expel the residual phosgene and the mixture was cooled. After distilling off the solvent at 60° to 80° C. under reduced pressure, 29 g of a crystalline residue of 1-isocyanato-5-nitro-anthraquinone remained, melting point: 150° to 153° C.

$C_{15}H_6N_2O_5$, MW 294.2.

The isocyanate content was 99.9% according to the NCO titration (compare Example 1).

Elementary analysis: calculated: 61.23% C; 2.06% H; 9.52% N; found: 61.4 61.3 C; 1.8 1.9 H; 9.3 9.3 N.

The IR spectrum shows the NCO band at 2,260 $cm^{-1}$.

EXAMPLE 3

Isocyanato-2-methyl-anthraquinone 35.5 g of 1-amino-2-methyl-anthraquinone were reacted with phosgene analogously to Example 1. A dark solid product (47.2 g) was obtained which, according to the isocyano titration, contained 59% by weight of 1-isocyanato-2-methyl-anthraquinone, which corresponds to a yield of 71%. The 1-isocyanato-2-methyl-anthraquinone decomposes on heating.

EXAMPLE 4

1-Isocyanato-chloro-anthraquinone 25.7 g of 1-amino-4-chloro-anthraquinone were reacted with phosgene in 2,000 g of o-dichlorobenzene analogously to Example 1. 28 g of a solid product were obtained which decomposes at about 250° C. whilst becoming dark-coloured, without melting. Isocyanato content (according to the NCO titration): 73.2%.

A mixture of 1-amino-6-chloro- and 1-amino-7-chloro-anthraquinone was likewise reacted with phosgene. 32 g of 1-isocyanato-x-chloro-anthraquinone were obtained with an isocyanato content of 75.2%. The yield was 84%. This isocyanate melts at about 160° C., with decomposition. The IR spectrum shows the NCO band at 2,250 $cm^{-1}$.

EXAMPLE 5

If instead of 1-amino-5-nitroanthraquinone, the same amount of 1-amino-8-nitroanthraquinone (purity: 93%) is employed and the procedure followed is as in Example 2, 1-isocyanato-8-nitroanthraquinone is obtained in 92% yield, in a purity of 91% (according to the NCO titration). Melting point: 224° C.

We claim:

1. A process for the preparation of a 1-isocyanato-anthraquinone, comprising introducing an anthraquinone into phosgene or a solution of phosgene in an inert anhydrous solvent at −10° to 50° C., heating the reaction mixture to 100° to 200° C. while passing phosgene through it, and subsequently expelling phosgene and hydrogen chloride from the reaction mixture with an inert medium which is gaseous under the reaction conditions.

2. The process according to claim 1, wherein the reaction with phosgene is carried out at 10° to 30° C. and the reaction mixture is heated at 150° to 185° C.

3. The process according to claim 1 or 2, wherein the reaction is carried out in an inert solvent and the weight ratio of solvent to 1-amino-anthraquinone is 10 to 100:1.

4. The process according to claim 1, wherein the anthraquinone is 1-amino-anthraquinone optionally substituted by $C_1$–$C_{12}$-alkyl, $C_1$–$C_4$-alkoxy, $CF_3$, CN, cyclopentyl, cyclohexyl, methylcyclohexyl, benzyl, phenethyl, phenyl, $C_1$–$C_4$-alkylphenyl, $C_1$–$C_4$-alkoxyphenyl, halophenyl, nitrophenyl, F, Br, Cl, acetyl or benzoyl.

* * * * *